United States Patent [19]

Maeshima

[11] Patent Number: 4,564,864
[45] Date of Patent: Jan. 14, 1986

[54] IMAGE FORMING APPARATUS

[75] Inventor: Katsuyoshi Maeshima, Tokyo, Japan

[73] Assignee: Canon Kabushiki Kaisha, Tokyo, Japan

[21] Appl. No.: 436,431

[22] Filed: Oct. 25, 1982

[30] Foreign Application Priority Data

Nov. 4, 1981 [JP] Japan .................. 56-175716
Nov. 4, 1981 [JP] Japan .................. 56-175718

[51] Int. Cl.⁴ .................. H04N 1/32; H04N 1/40
[52] U.S. Cl. .................. 358/280; 358/296
[58] Field of Search .......... 358/280, 256, 257, 296, 358/300, 302

[56] References Cited

U.S. PATENT DOCUMENTS

| | | | |
|---|---|---|---|
| 2,404,307 | 7/1946 | Whitaker | 358/280 |
| 3,800,080 | 3/1974 | Fuwa | 358/280 |
| 4,237,494 | 12/1980 | Yamaguchi | 358/280 |
| 4,353,096 | 10/1982 | Sakurai | 358/280 |

FOREIGN PATENT DOCUMENTS

1531401 11/1978 United Kingdom .

*Primary Examiner*—Howard W. Britton
*Attorney, Agent, or Firm*—Fitzpatrick, Cella, Harper & Scinto

[57] ABSTRACT

An image forming apparatus capable of accurate recording of input image information through a real-time image processing. It is also capable of simultaneously driving plural recording units, and of avoiding distortion in the recorded image even when the recording unit is not synchronized with the input information. These features are attained by the use of plural memories successively selected for image signal recording and for signal read-out, wherein at least one of the memories has no access while others are used for signal write-in and read-out.

13 Claims, 8 Drawing Figures

IMAGE FORMING APPARATUS

BACKGROUND OF THE INVENTION

1. Field of the Invention

The present invention relates to an image forming apparatus for image recording according to image information obtained for example by reading an original document.

2. Description of the Prior Art

As an example of such image forming apparatus, there is already known so-called facsimile apparatus for image recording by a printer in response to image information transmitted from a distant place through a public telephone line. The conventional facsimile apparatus is however associated with a low resolving power limited to the order of 8 or 7.7 lines/mm and with a low image processing speed, so that an improvement in the resolving power and the processing speed would be desirable.

Also, in the case of transmitting image information read on an image reading unit simultaneously to plural printers, it is difficult to synchronize the recording operations of such printers with the image reading operation for example of a solid-state imaging device in the image reading unit, since said recording operations have different timings from unit to unit.

It is therefore proposed to temporarily store the image information of one page or several pages in a memory, and to read said information thus stored in synchronization with the horizontal synchronizing signal for each printer unit.

Such memory will however require a rather large capacity, for example on the order of 32 Mbits in the case of recording an A3-sized original with a resolving power of 16 dots/mm, and will therefore be expensive.

Also, in the case of real-time recording of the image information from the image reading unit, the synchronization between the reading unit and the printer unit is often disrupted due to ambient conditions or time-dependent changes, and such disrupted synchronization is a cause of deterioration in the image quality.

SUMMARY OF THE INVENTION

In consideration of the foregoing, the object of the present invention is to provide an image forming apparatus capable of securely recording the input image information.

Another object of the present invention is to provide an image forming apparatus adapted for real-time image processing.

Still another object of the present invention is to provide an image forming apparatus allowing one to record image information from the same information source simultaneously by plural recording units.

Still another object of the present invention is to provide an image forming apparatus capable of preventing disruption in the image recording even when the synchronization between a source of image information and a recording unit for recording said image information is disrupted.

Still another object of the present invention is to provide an image forming apparatus capable of driving a source of image information and a recording unit for recording said image information in independent timings.

Still another object of the present invention is to provide an image forming apparatus capable of simultaneously providing plural recording units with image information of a high resolving power in the order of 16 dots/mm by the use of a buffer memory of a limited capacity on the order of several lines to several tens of lines.

The foregoing and still other objects and advantages of the present invention will become fully apparent from the following description to be taken in conjunction with the attached drawings.

BRIEF DESCRIPTION OF THE DRAWINGS

FIGS. 1-1 and 1-2 are schematic views showing an embodiment of the image reading unit;

DETAILED DESCRIPTION OF THE PREFERRED EMBODIMENTS

Figure 11:
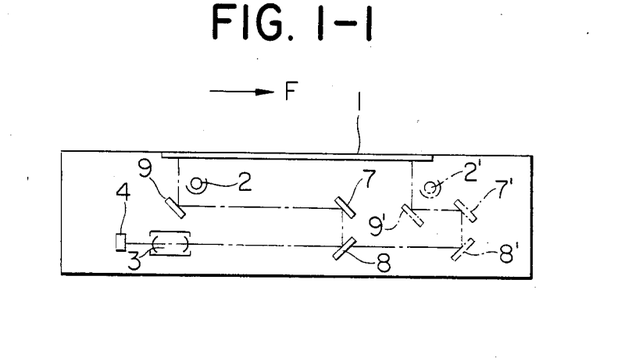

FIG. 1—1 is a cross-sectional view of an image reading unit representing an example of the source of image information, wherein provided are an original supporting glass plate 1, a rod-shaped light source 2 such as a halogen lamp or a fluorescent lamp, a first mirror 9, a second mirror 7, a third mirror 8, a lens 3 and a solid-state one-dimensional image sensor 4 such as a charge-coupled device. It is to be noted that three sets of said lens 3 and image sensor are provided (although only one set is shown in FIG. 1—1) 4 so that each set reads about one-third of the original image.

An original document placed on the glass plate 1 is illuminated by the rod-shaped light source 2, and the reflected light is focused onto the charge-coupled device 4 positioned with its main scanning direction perpendicular to the plane of the drawing, through the first, second and third mirrors 9, 7, 8 performing subsidiary scanning on the original document and the lenses 3. The first mirror 9 is constructed integral with the light source 2 by an unrepresented support member and moves in a direction F shown in FIG. 1 along unrepresented rails to effect subsidiary scanning of the original document. The second and third mirrors 7, 8 are supported integrally by an unrepresented support member and move along unrepresented rails in the same direction, but at half the speed, as the first mirror 9. In this manner the light source 2, the first, second and third mirrors 9, 7, 8 respectively move to the broken-lined positions 2', 9', 7', 8', while always maintaining a constant optical path length from the glass plate 1 to the lenses 3 through the mirrors 9, 7, 8.

The above-described image reading unit performs the subsidiary scanning in the longitudinal direction on an A3-sized original (297×420 mm) or in the transversal direction on an A4-sized original (210×297 mm), with a line density of 16 lines/mm. Thus the main scanning, providing 4752 bits in a line, is repeated 6720 times for the A3-sized original or 3360 times for the A4-sized original.

As already explained before, there are provided three sets of the charge-coupled device 4 for photoelectric conversion of the original image and the lens 3, so that each set covers approximately one-third of 4752 bits in each line.

Figure 12:
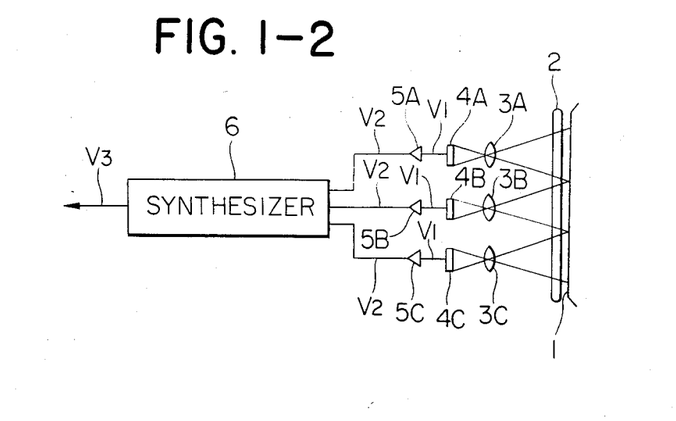

FIG. 1-2 shows an example of the image reading circuit for use in the image reading unit shown in FIG. 1—1, wherein provided are an original document 1, a rod-shaped light source 2, lenses 3A, 3B, 3C, solid-state one-dimensional image sensors 4A, 4B, 4C such as charge-coupled devices, amplifiers 5A, 5B, 5C, and a synthesizer circuit 6.

As explained in the foregoing, the original document 1 to be copied is illuminated by the light source 2, and the reflected light is focused by the lenses 3A, 3B, 3C onto the charge-coupled devices (CCD's) 4A, 4B, 4C through the scanning mirrors shown in FIG. 1—1. The image information signals V1 obtained by photoelectric conversion by three CCD's 4A, 4B, 4C are respectively reformed by amplifiers 5A, 5B, 5C and supplied to the synthesizer circuit 6, which combines the image information signals V2 supplied from said amplifiers 5A, 5B, 5C to obtain an image information signal V3 equivalent to the signal obtained from a single CCD and sends said signal to an image processing unit such as a printer to be explained later. The scanning of an A4-sized original with an ordinary CCD with a capacity of 2048 bits at maximum as in the conventional facsimile apparatus only provides a resolving power of 6.9 dots/mm (=2048 bits/297 mm) which is insufficient for realizing satisfactory image quality. On the other hand, in the present embodiment, the use of three CCD's 4A, 4B, 4C for providing the image information signals V1 ensures a resolving power as high as about 16 dots/mm on the reproduced image as explained in the foregoing.

Figure 2:
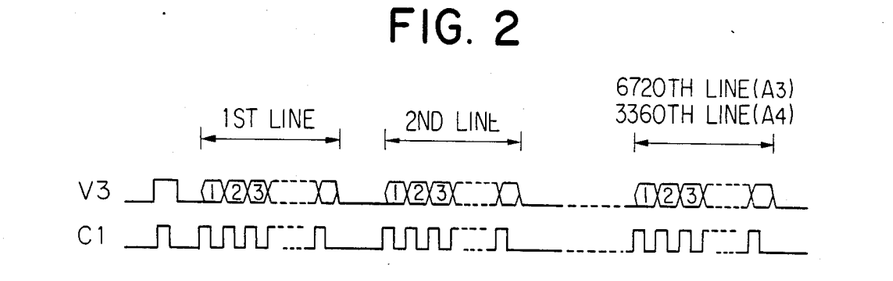
FIG. 2 is a timing chart showing the relation between the image information released from a synthesizer shown in FIG. 1 and clock pulses.

In the present embodiment, the image information signal V3 (hereinafter called video signal) and clock pulses C1 for ensuring the transmission of said video signal V3 are transmitted to the printer unit through two separate lines. As shown in FIG. 2, the video signal V3 changes its state at the start of each clock pulse but remains stable at the end thereof.

Figure 3:
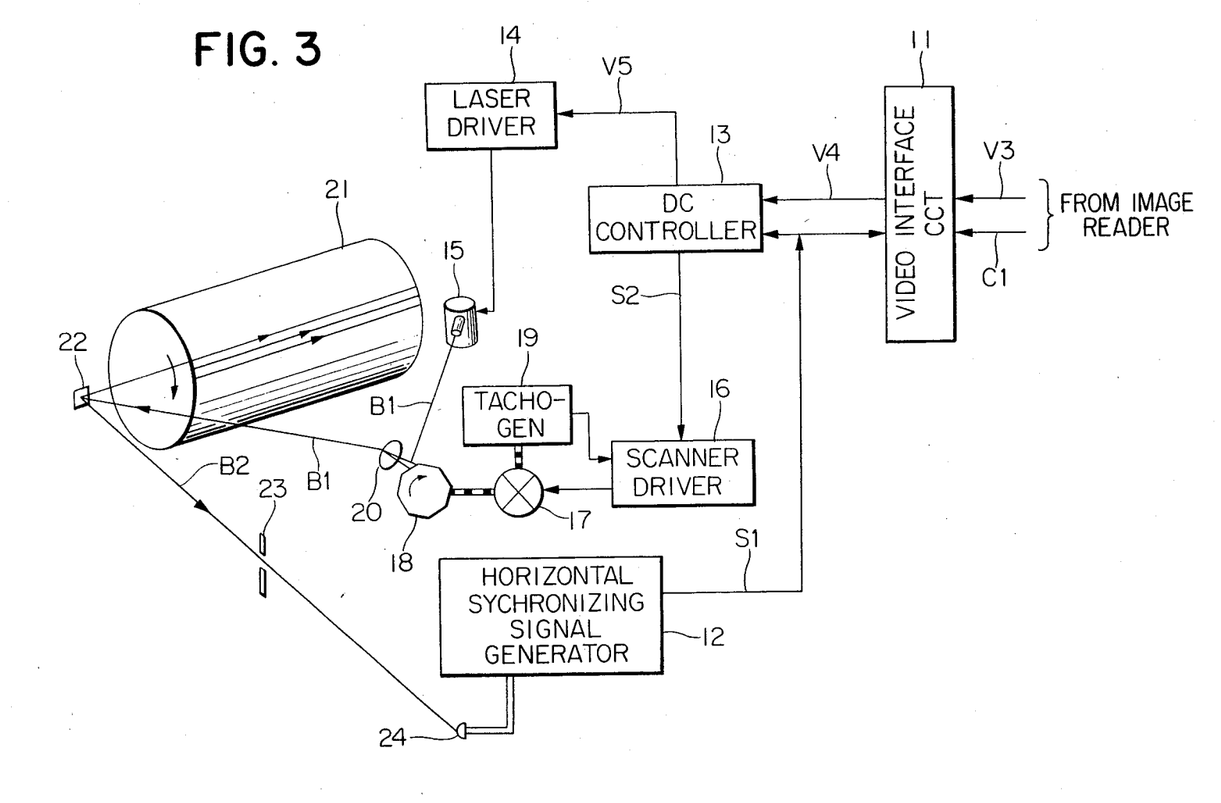
FIG. 3 is a schematic view showing an embodiment of the printer receiving the image information transmitted from the unit shown in FIG. 1.

FIG. 3 shows the structure of a printer, representing an example of the unit for image processing in response to image information. A video interface circuit (synchronizing circuit) 11 receives the video signal V3 from the synthesizer circuit 6 shown in FIG. 1-2 and supplies a DC controller 13 with a video signal V4 synchronized with a horizontal synchronization signal (beam detection pulse) S1 released from a horizontal synchronization signal generator 12 provided in each printer unit, thus achieving synchronization between the signal read-out timings of the CCD's 4A, 4B, 4C and said video signal V4 supplied to each printer unit. Said horizontal synchronization signal generator 12 supplies the video interface circuit 11 and the DC controller 13 with said horizontal synchronization signal S1. Said DC controller 13 supplies, in response to the video signal V4 and the horizontal synchronizaion signal S1, a laser driver 14 with a video signal V5 to effect on-off control of a semiconductor laser 15, thereby modulating a laser beam B1, and also supplies a scanner driver 16 with a scanner driving signal S2 to rotate a polygonal mirror 18 at a determined speed by means of a scanner motor 17. A tachogenerator 19 detects the revolution of said scanner motor 17 and supplies the scanner driver 16 with the detected revolution as a feedback signal. The polygonal mirror 18 deflects the laser beam B1 from the semiconductor laser 15 into a substantially horizontal scanning motion. An F$\theta$ lens 20 eliminates the difference in the scanning speed of the laser beam B1 at the lateral part and at the central part of a photosensitive drum 21. A photodiode 24 receives the laser beam reflected by a mirror 22 through a slit 23 and supplies a corresponding signal to the horizontal synchronization signal generator 12.

The above-described printer is so-called laser beam printer in which the image formation is achieved by an electrophotographic process utilizing a laser beam, and the function of said printer will be explained in the following. The video signal V3 and the clock pulses C1 transmitted from the image reading unit shown in FIG. 1-2 and the horizontal synchronization signal S1 supplied from the horizontal synchronization signal generator 12 in each printer unit are mutually synchronized in the video interface circuit 11, which thus supplies the DC controller 13 with the video signal V4. Said DC controller 13 supplies the laser driver 14 with the video signal V5 in response to the horizontal synchronization signal S1, and also supplies the scanner driver 16 with the scanner driving signal S2. The laser driver 14 effects on-off control of the semiconductor laser 15 in response to the video signal V5 to modulate the laser beam B1, and the scanner driver 16 controls the rotation of the polygonal mirror 16 in response to the scanner driving signal S2. The laser beam B1 emitted from the semiconductor laser 15 is deflected by the rotating polygonal mirror 18 and achieves raster scanning on the photosensitive drum 21 through the F$\theta$ lens 20, thereby recording an image as an electrostatic latent image. Also the laser beam B2 reflected by the mirror 22 is received, through the slit 23, by the photodiode 24 to obtain the horizontal synchronization signal S1, indicating the scanning start position of the laser beam B1, from the horizontal synchronization signal generator 12. Said signal S1 is supplied to the DC controller 13 and to the video interface circuit 11 for controlling the output timings of the video signal V4, V5 as explained in the foregoing.

Figures 4, 4B:
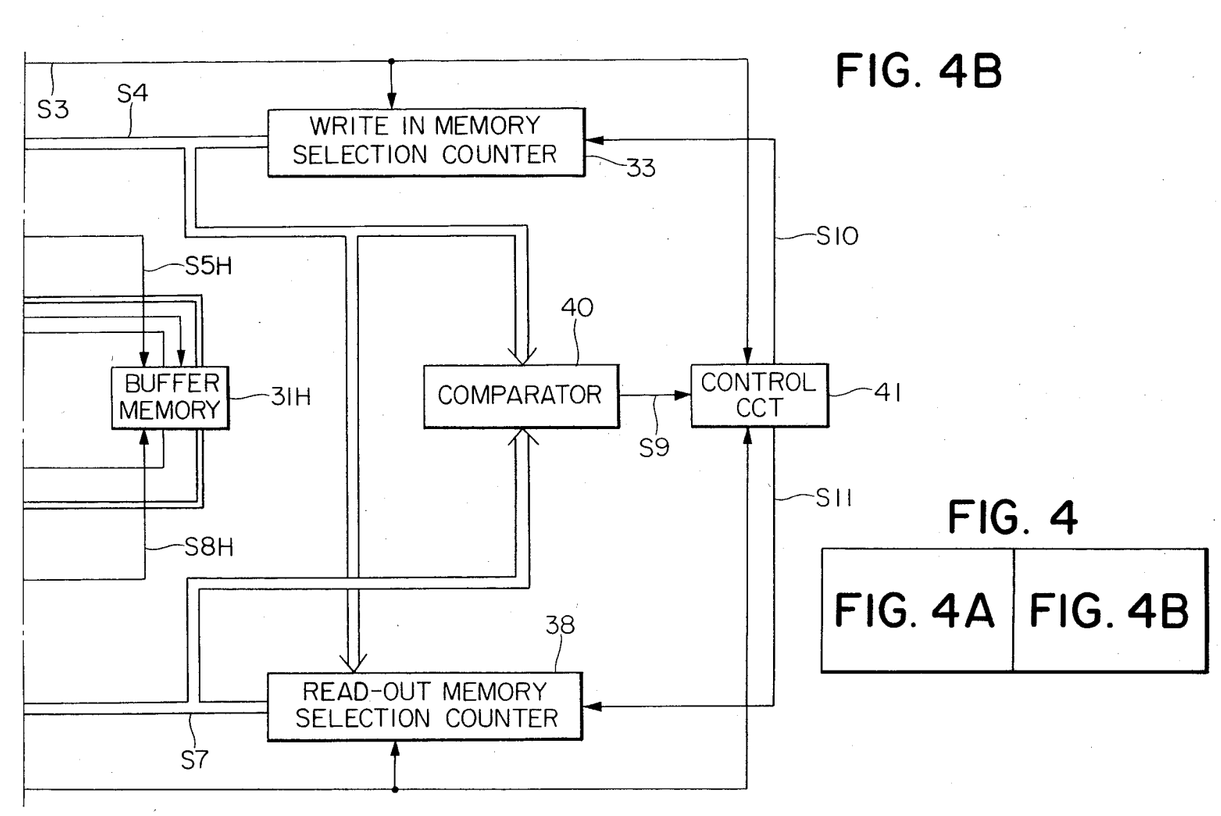
FIG. 4 shows how to combine FIGS. 4A and 4B as a block diagram showing an embodiment of the video interface circuit shown in FIG. 3.
Figure 4A:
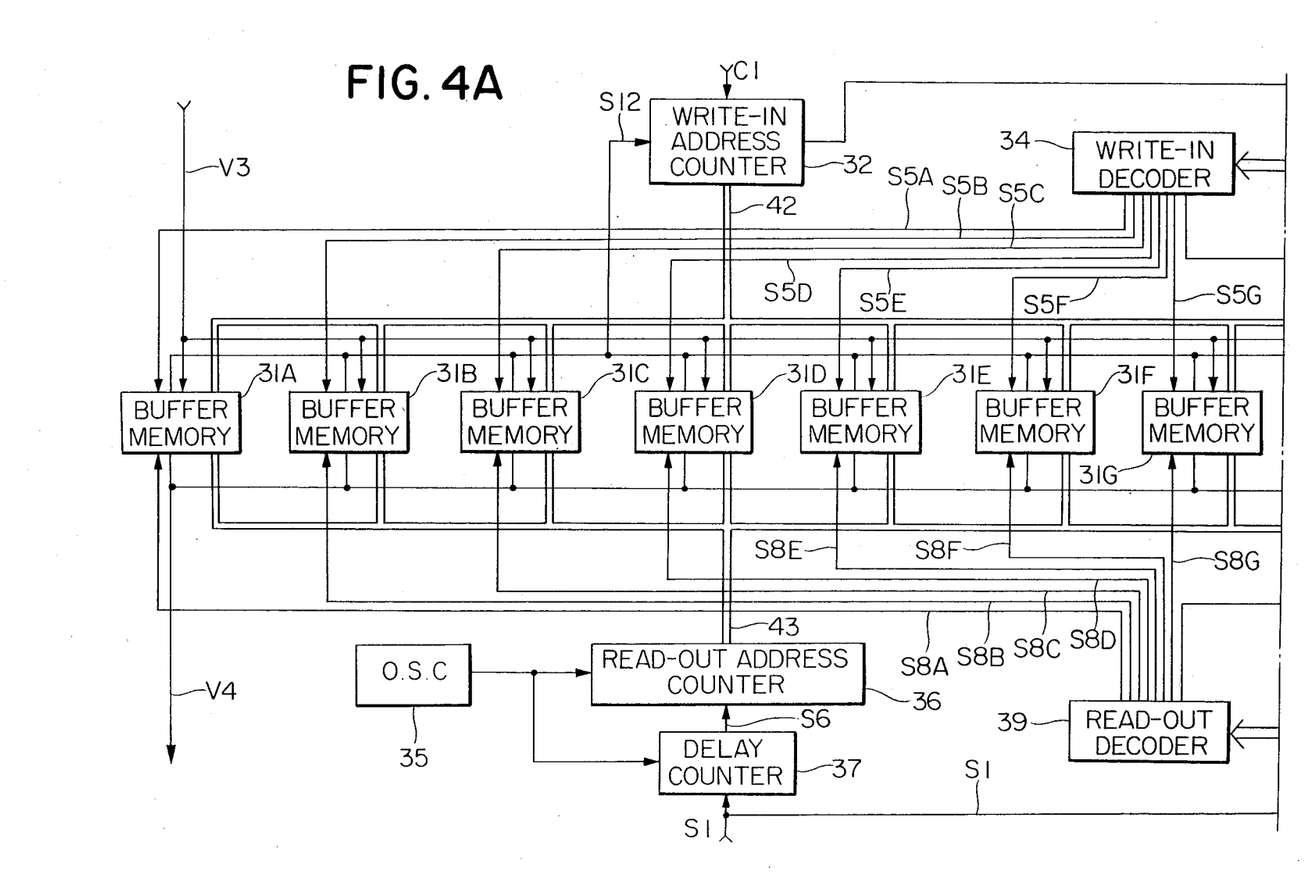

FIG. 4 shows an embodiment of the video interface circuit 11 shown in FIG. 3, in which buffer memory units 31A–31H are composed of plural memories each of which is capable of temporarily storing the video signal V3 of one scanning line or 4752 bits. A write-in address counter 32, composed for example of SN74191 manufactured by Texas Instruments Inc., performs address control of said memories and releases an address counter signal S3 at each storage of the video signal V3 of one scanning line in the buffer memory unit 31A–31H. A write-in memory selecting counter 33, composed for example of SN74191 manufactured by Texas Instruments Inc., is stepped up at each reception of the counter signal S3, and releases a 3-bit signal S4 indicating the count of said counter signals S3. A write-in decoder 34, composed for example of SN74138 manufactured by Texas Instruments Inc., decodes said signal S4 and sequentially selects the memories of the buffer memory unit 31A–31H, utilizing thus decoded signal as memory selecting signals S5A–S5H. An oscillator 35 is adjusted according to the signal read-out speed of the printer unit. A read-out address counter 36, composed for example of SN74191 manufactured by Texas Instruments Inc., controls the read-out address of the memories. A delay counter 37 supplies the address counter 36 with a read-out enable signal S6 when the laser beam reaches the image area on the photosensitive drum 21, with a determined delay from the horizontal synchronization signal S1, by counting the clock pulses from the oscillator 35.

A read-out memory selecting counter 38, composed for example of SN74191 manufactured by Texas Instruments Inc., is stepped up at each read-out of the video signal V4 of a scanning line from the buffer memory units 31A–31H, or at each horizontal synchronization signal S1, and releases a 3-bit signal S7 indicating the number of said count. A read-out decoder, composed for example of SN74138 manufactured by Texas Instruments Inc., decodes said signal S7 and sequentially selects the buffer memory units 31A–31H, utilizing the thus decoded signal as memory selecting signals S8A–S8H. A comparator 40, composed for example of SN7485 manufactured by Texas Instruments Inc., compares the signal S4 indicating the count of the write-in memory selecting counter 33 with the signal S7 indicating the count of the read-out memory selecting counter 38, and releases a corresponding detection signal S9. A memory selecting counter control circuit 41 interrupts, when the same memory in the buffer memory units 31A–31H is selected for the signal write-in and signal read-out by the aforementioned decoders 34 and 39, the function of either of the memory selecting counters 33, 38 having a lower frequency of clock pulses corresponding to the speed of image reading or image recording. There are also provided an address bus 42 for example of 13 bits for connecting the write-in address counter 32 with the memories 31A–31H, and an address bus 43 for connecting the read-out address counter 36 with said memories 31A–31H.

In the circuit shown in FIG. 4, the video signals V3 transmitted from the image reading unit are stored in succession in the buffer memory units 31A–31H sequentially selected by the write-in decoder 34. At each storage of the video signal V3 of a scanning line in either one of the memories 31A–31H, the signal S3 released from the write-in address counter 32 steps up the write-in memory selecting counter 33, and the signal S4 indicating the count thereof is supplied to the write-in decoder 34, comparator 40 and read-out memory selecting counter 38. The decoder 34 decodes said signal S4 and sequentially selects the buffer memory units 31A–31H by supplying the thus decoded signal as the memory selecting signals S5A–S5H to said memory units. In this manner, at the signal write-in, the video signal V3 for example of the first line is stored in the memory 31A, that of the second line is stored in the memory 31B, that of the third line is stored in the memory 31C, ..., that of the eighth line is stored in the memory 31H, and the signal of the ninth line is stored again in the memory 31A.

On the other hand, the signal read-out from the buffer memory units 31A–31H is initiated from a memory positioned most distant from the memory in signal write-in operation. At the start of signal read-out, the upper bit of the signal S4 indicating the current count of the write-in memory selecting counter 33 is read, inverted and loaded in the read-out memory selecting counter 38. Said counter 38 is stepped up from said loaded value at each read-out of the video signal of a scanning line from the buffer memory units 31A–31H, and the signal S7 indicating the value of said count. The read-out decoder 39 decodes said signal S7 and supplies the thus decoded signal as the memory selecting signals S8A–S8H to the buffer memory units 31A–31H. Consequently, the signal read-out is conducted from the memory unit 31E or 31F respectively when the signal write-in is effected on the memory unit 31A or 31B. Stated differently, the signal read-out is started from a memory, for example 31E, most distant from the memory in signal write-in operation, for example 31A, with non-assessed memories therebetween.

As an example, for an A3-sized original requiring 6720 scanning lines, it is possible to avoid simultaneous accesses for signal write-in and signal read-out to the same memory as long as the difference between the signal write-in frequency in the image reading unit and the signal read-out frequency in the printer unit does not exceed 0.06%, which corresponds to an aberration of $6720 \times 0.06/100 \approx 4$ lines. Such frequency difference not exceeding 0.06% can be easily achieved by the use of crystal oscillators.

As explained in the foregoing, the printer unit is equipped with plural buffer memories each of a limited memory capacity in the order of one scanning line, and the signal write-in operation and the signal read-out operation are independently effected on different memories. Consequently the recording operation for the image information supplied from the image reading unit can be carried out according to the independent operational timing of the printer unit, without requiring a page memory of a capacity corresponding to the entire area of the original. It is therefore not necessary, in case of recording the image information from the image reading unit with plural printer units, to synchronize the operational timings of said plural printer units.

In case the aforementioned frequency difference exceeds 0.06%, the number of buffer memories may be accordingly increased but such solution is not economical.

Also in case the difference between the signal write-in frequency and the signal read-out frequency accidentally exceeds 0.06% due to a cause such as temperature, shock or deterioration in the components, a same memory may be simultaneously selected for the signal write-in and for the signal read-out. In such case, since the frequencies for the signal write-in and for the signal read-out are approximately equal, the signal write-in and the signal read-out will be carried out simultaneously on the same memory for a long period, thus disabling normal image recording.

The above-mentioned drawback is however prevented in the present embodiment by the memory selecting counter control circuit 41, which temporarily interrupts the function of the memory selecting counter 33 or 38 having a lower frequency. More specifically the comparator 40 compares the signals S4 and S7 indicating the counts of said memory selecting counters 33, 38 and sends a corresponding detection signal S9 to the memory selecting counter control circuit 41. In response to a detection signal S9 indicating the coincidence of said counts, the control circuit 41 identifies that the same memory is selected for the signal write-in and for the signal read-out and releases a stop signal S10 or S11 to temporarily interrupt the function of the memory selecting counter 33 or 38 having the lower operating frequency until said detection signal S9 indicating the coincidence of the counts is cancelled.

Thus, in case the function of the write-in memory selecting counter 33 is stopped, the same video signal V4 is repeatedly supplied to the printer unit, but the influence to the recorded image is negligibly small since only 8 lines are overlappingly formed in the entire image. On the other hand, in case the read-out memory selecting counter 38 is stopped, the image information is repeatedly loaded in one of the buffer memory units 31A-31H, but the influence to the recorded image is again negligibly small since only 8 lines become deficient in the recorded image. In this manner the present embodiment is capable of providing a normal image by preventing simultaneous access to the same memory for the signal write-in and read-out through the use of the comparator 40 and the memory selecting counter control circuit 41, against a small fluctuation of the frequencies for the signal write-in and signal read-out.

Figure 5:
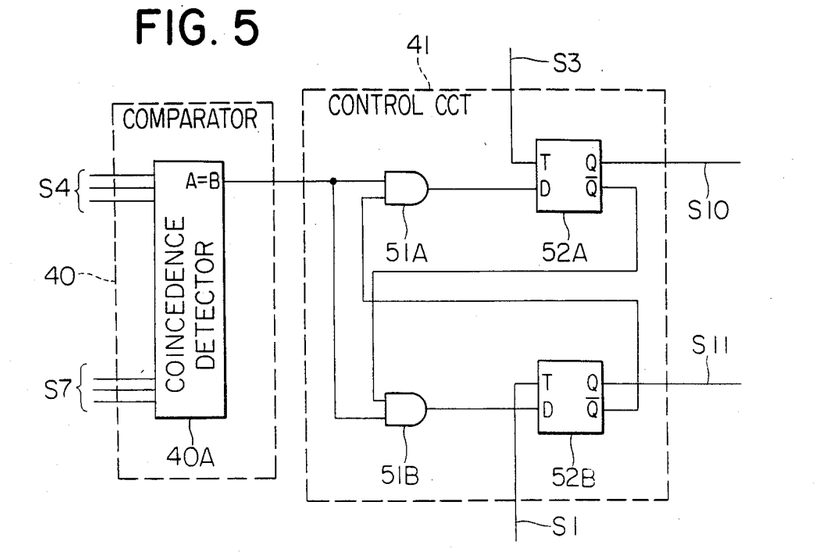
FIG. 5 is a block diagram showing an embodiment of the comparator and the memory selecting counter circuit shown in FIG. 4.

FIG. 5 shows an embodiment of the comparator 40 and the memory selecting counter control circuit 41 shown in FIG. 4, wherein provided are a coincidence detector 40A, AND gates 51A, 51B, and flip-flops 52A, 52B. In case the count S4 of the write-in memory selecting counter 33 coincides with the count S7 of the read-out memory selecting counter 38, the coincidence detector 40A of the comparator 40 sends a coincidence signal "1" to the AND gates 51A, 51B. On the other hand, the counter signal S3 from the write-in address counter 32 and the horizontal synchronization signal S1 from the printer unit respectively correspond to the write-in memory changing clock pulses and the read-out memory changing clock pulses for stepping up the selecting counters 33, 38. Consequently either one of the flip-flops 52A, 52B corresponding to the signal S3 or S1 of the lower frequency provides an H-level output signal Q, whereby the counting operation of the counter 33 or 38 is interrupted until such coincidence of memory is cancelled.

Figure 6:
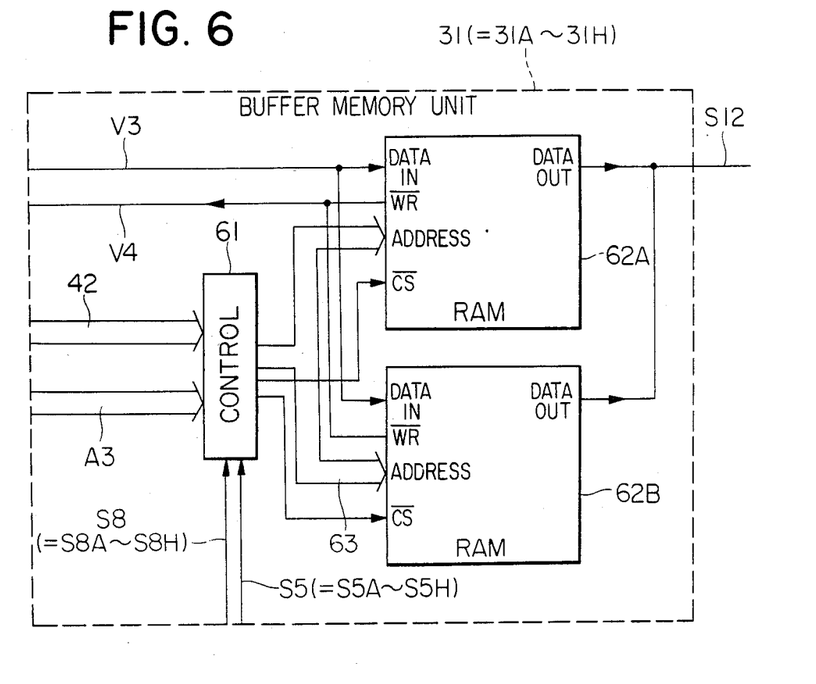
FIG. 6 is a block diagram showing an embodiment of the buffer memory unit shown in FIG. 4.

FIG. 6 shows an embodiment of a buffer memory unit 31 which can be either one of the buffer memory units 31A-31H shown in FIG. 4. In FIG. 6 there are shown a control circuit 61, composed for example of SN74257 manufactured by Texas Instruments Inc., for receiving the signals S5A-S5H and S8A-S8H from the decoders 34, 39 and the signals 42, 43 from the address counters 32, 26; high-speed static random access memories 62A, 62B, composed for example of MB8147 manufactured by Fujitsu Co., and a memory address bus 63 which is connected either to the write-in address bus 42 or to the read-out address bus 43.

The control circuit 61 connects either the write-in address bus 42 or the read-out address bus 43 to the random access memories 62A, 62B through the memory address bus 63, in response to a write-in memory selecting signal S5 (either one of the signals S5A-S5H) and to a read-out memory selecting signal S8 (either one of the signals S8A-S8H). In case of the image read-out, the read-out memory selecting signal S8 is supplied to the control circuit 61, whereby the read-out address bus 43 is connected to the memory address bus 63 to read the video signal V4 from the random access memories 62A, 62B. Also in case of the image write-in, the write-in memory selecting signal S5 is supplied to the control circuit 61, whereby the write-in address bus 42 is connected to the memory address bus 63 to load the input video signal V3 into the random access memories 62A, 62B. Simultaneously a write-in signal S12 is supplied to the address counter 32. The random access memories 62A, 62B perform the above-described function only when a chip selecting signal CS is supplied from the control circuit 61.

As explained in the foregoing, the image forming apparatus of the present invention, in which the image information obtained from an image reading unit is recorded by a printer unit, is featured by the use of a video interface circuit (synchronizing circuit) provided with plural memories of a small capacity for temporarily storing the image information, wherein the write-in of the image information from said image reading unit into said memories and the read-out of the image information from said memories are respectively controlled by the clock pulses obtained from said image reading unit and by the horizontal synchronization signals obtained from the printer unit, and said read-out operation is initiated from a memory distant from the memory currently in the signal write-in operation. Consequently it is rendered possible to avoid errors in the synchronization without the use of a large memory in the case of simultaneously driving plural printer units by an image reading unit, and to achieve a high resolving power in the order of 16 dots/mm on the recorded image through the use of a memory of a relatively small capacity in the order of several lines to several tens of lines.

Also in the case a memory is selected simultaneously for the signal write-in and signal read-out operations, the memory selection for either operation with the lower frequency is temporarily stopped, whereby the image distortion is limited to 8 scanning lines, corresponding to a width of 0.5 mm on the recorded image even in case of a disorder in the synchronization between the image reading unit and the printer unit by some reason. In this manner a high image quality and a high resolving power are assured on the recorded image. Also in case of simultaneously driving plural printer units by an image reading unit, it is rendered possible to obtain recorded images with a high resolving power in the order of ca. 16 dots/mm, by means of a buffer memory of a relatively small capacity in the order of several lines to several tens of lines.

Although the present invention has been explained by an embodiment in which the image information obtained by reading an original is recorded by a laser beam printer, it is also possible to obtain the image information from a memory device such as a magnetic disk or a magnetic tape or from a microfilm projector, and to record said image information with other devices such as an ink jet printer or a thermal printer.

What I claim is:

1. An image forming apparatus comprising:
   input means for sequentially entering image information, which information is organized in lines, on each line with a first timing;
   plural memory means each capable of storing a line of image information therein;
   write-in means for sequentially selecting one by one said plural memory means, and writing in the image information entered from said input means into the selected memory means;
   read-out means for sequentially selecting one by one said plural memory means, and reading out the image information on each line from the selected memory means with a second timing independent of the first timing, while the writing-in operation by said write-in means is carried out; and
   recording means for performing image recording with the second timing in accordance with the image information read out from said memory means,
   wherein said read-out means starts operation for selection of said memory means in accordance with the selection operation by said write-in means so as not to permit simultaneous selection of the same memory means by said write-in means and said read-out means.

2. An image forming apparatus according to claim 1, wherein said read-out means is adapted to select one by one said memory means in response to the synchronizing signals for the recording operation of said recording means.

3. An image forming apparatus according to claim 1, wherein said write-in means is adapted to select one by one said plural memory means based on clock signals entered in synchronism with the image information inputted from said input means.

4. An image forming apparatus according to claim 1, wherein said input means is reading means adapted for photoelectrically raster scanning an original image and providing corresponding image information in the unit of a scanning line.

5. An image forming apparatus according to claim 1, wherein said recording means is adapted to record the image in the unit of a scanning line.

6. An image forming apparatus comprising:
input means for sequentially entering image information in portions each of a predetermined amount;
plural memory means each capable of storing a predetermined amount of image information therein;
write-in selecting means for sequentially selecting one by one said plural memory means for the write-in of the predetermined amount of image information entered from said input means into the selected memory means;
read-out selecting means for sequentially selecting one by one said plural memory means for the read-out of the predetermined amount of image information from the selected memory means;
recording means for performing image recording in accordance with the image information read out from said memory means; and
means for temporarily stopping the selecting function of either one of said write-in selecting means and said read-out selecting means in the case that the same one of said plural memory means is selected by said write-in selecting means and by said read-out selecting means.

7. An image forming apparatus according to claim 6 wherein said write-in selecting means is adapted to select said memory means in response to clock signals entered in synchronization with the image information to be stored in said memory means.

8. An image forming appparatus according to claim 6, wherein said read-out selecting means is adapted to select said memory means in response to synchronizing signals for the recording operation of said recording means.

9. An image forming apparatus according to claim 6, wherein said stopping means comprises detection means for detecting the coincidence between a write-in selection signal supplied from said write-in selecting means for selecting said memory means and a read-out selection signal supplied from said read-out selecting means for selecting said memory means, and said stopping means stops said selecting function in response to the detection of said coincidence.

10. An image forming apparatus according to claim 6, wherein each of said plural memory means has a memory capacity corresponding to one line of the recording operation of said recording means.

11. An image forming apparatus according to claim 6, wherein the write-in of the image information into said memory is effected in synchronization with a clock signal supplied together with said image information from said input means, and the read-out of the image information from said memory means is effected in synchronization with a clock signal associated with the recording operation of said recording means.

12. An image forming apparatus according to claim 6, wherein said input means is reading means adapted for photoelectrically raster scanning an original image and providing corresponding image information in the unit of a scanning line.

13. An image forming apparatus according to claim 6, wherein said recording means is adapted to record the image in the unit of a scanning line.

* * * * *

UNITED STATES PATENT AND TRADEMARK OFFICE
CERTIFICATE OF CORRECTION

PATENT NO. : 4,564,864
DATED : January 14, 1986
INVENTOR(S) : KATSUYOSHI MAESHIMA It is certified that error appears in the above-identified patent and that said Letters Patent is hereby corrected as shown below:

Sheet 2 of 5 change "SYCHRONIZING" to --SYNCHRONIZING--.

Sheet 3 of 5, change "WRITE IN MEMORY" to --WRITE-IN MEMORY--.

Sheet 5 of 5, change "COINCEDENCE" to --COINCIDENCE--.

Col. 10, lines 3-4 change "claim 6/wherein" to --claim 6, wherein--.

Col. 10, line 28, change "memory is" to --memory means is--.

Col. 1, line 65, change "in independent" to --with independent--.

Col. 2, line 2, change "in the order" to --on the order--.

Col. 2, lines 39-40, change "sensor are provided (although only one/set is shown in FIG. 1-1) 4 so" to --sensor 4 are provided (although only one set is shown in FIG. 1-1) so--.

Col. 6, line 8, change "assessed" to --accessed--.

Col. 6, line 40, change "components, a same" to --components, the same--.

Signed and Sealed this

Twenty-first Day of October, 1986

[SEAL]

Attest:

DONALD J. QUIGG

Attesting Officer   Commissioner of Patents and Trademarks